United States Patent [19]

Spiesman

[11] Patent Number: 4,631,733
[45] Date of Patent: Dec. 23, 1986

[54] TRANSCEIVER

[75] Inventor: Robert L. Spiesman, Phoenix, Ariz.

[73] Assignee: Honeywell Inc., Phoenix, Ariz.

[21] Appl. No.: 682,521

[22] Filed: Dec. 17, 1984

[51] Int. Cl.$^4$ .................. H04L 27/18; H04L 7/06; H04L 1/24

[52] U.S. Cl. .................................. 375/7; 375/9; 375/55; 375/113; 371/22

[58] Field of Search .............. 375/7, 8, 9, 36, 55, 375/110, 113, 10, 121; 370/24, 37, 100, 30, 15; 340/825.2; 371/15, 22

[56] References Cited

U.S. PATENT DOCUMENTS

| | | | |
|---|---|---|---|
| 2,630,493 | 3/1953 | Neiswinter | 375/7 |
| 3,088,071 | 4/1963 | Matsushima | 375/113 |
| 4,013,956 | 3/1977 | Dornaus et al. | 375/8 |
| 4,270,214 | 5/1981 | Davis et al. | 375/7 |
| 4,529,979 | 7/1985 | Kusama et al. | 370/15 |

Primary Examiner—Benedict V. Safourek
Attorney, Agent, or Firm—A. A. Sapelli; J. S. Solakian; A. Medved

[57] ABSTRACT

A transceiver for applying signals to and receiving signals from a transmission line through a coupling transformer having a transmission line winding connected to the transmission line and a transceiver winding. A transmitter circuit is connected to the transceiver winding to apply Manchester encoded digital data signals having a high frequency to the transmission line. The transmission line can, at any instant in time, also be carrying data signals which are applied to the transmission line by other transceivers. However, only one transceiver transmits such data signals at any one time. At the same time as the transmission line may be carrying data signals, it can also be carrying timing signals which are applied to it by a timing driver circuit. The timing signals have a significantly lower frequency than the data signals and a quasi-sinusoidal wave form. The transceiver includes a first receiver which is connected across the transceiver winding and which amplifies and reshapes any data signals present across the transceiver winding and produce such signals as the data signal output of the transceiver. A second receiver is also connected across the transceiver winding. This second receiver reconstitutes the received timing signals included in the signals induced or present across the transceiver winding so that the output of the second receiver is a square wave timing signal, the frequency of which is that of the quasi-sinusoidal timing signal received.

5 Claims, 1 Drawing Figure

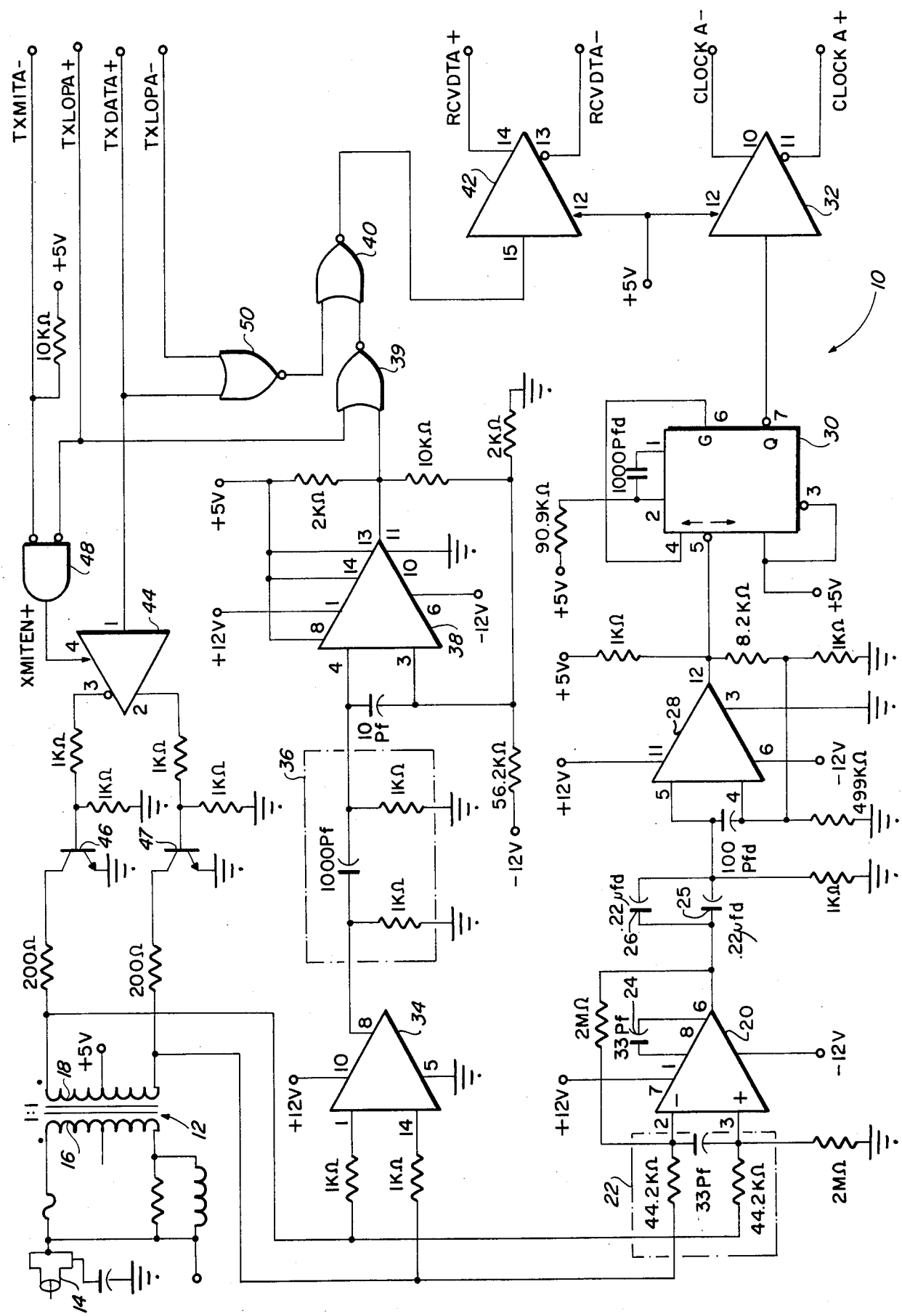

TRANSCEIVER

BACKGROUND OF THE INVENTION

1. Field of the Invention

This invention is in the field of transceivers, and more particularly relates to a transceiver which is used to drive substantially square wave form signals having a high frequency onto a transmission line through a coupling transformer and of receiving through the transformer such high frequency signals transmitted by another such transceiver and a lower frequency signal having a quasi-sinusoidal wave form which signals are concurrently carried by the transmission line.

2. Description of the Prior Art

Transceivers which transmit and receive signals over a transmission line are well-known in the art. Where signals from two or more sources are to be transmitted, or carried concurrently over a single conductor, this is typically accomplished by some form of multiplexing or modulation system using a carrier signal. Applicant is unaware of any transceiver that can transmit and receive a first type of signal at one frequency over a single conductor and which can also receive a second type signal at a different frequency which is also concurrently carried by the single conductor in the absence of any modulators or demodulators, multiplexers or demultiplexers.

The environment in which the transceiver of this invention is used is a token passing local area network in which a limited number, sixty four being the maximum number in the preferred embodiment, communicate with one another over the network's transmission medium, a pair of coaxial cables. Communication between physical modules is at a frequency of 5.0 MHz with the physical module of the network having the token at any given time and being enabled to transmit Manchester encoded binary data signals at a 5.0 MHz frequency over the transmission medium to any one or all of the physical modules of the network. Each physical module must therefore have the capability of transmitting and of receiving data signals at the 5.0 MHz frequency over both cables of the network medium.

In addition, there is a requirement, particularly where the network forms or constitutes, a control system for monitoring and controlling industrial and utility plants, to time the occurrence of events with a high degree of precision. In the environment in which the transceiver of this invention is utilized each physical module includes a timing subsystem. Selected ones of the timing subsystem of the physical modules prepare and transmit encoded timing information in the form of timing signals over the networks communication medium so that the timing subsystems of all physical modules can synchronize within a desired degree of accuracy, their internal senses of time with the internal sense of the timing subsystem of the physical module which timing subsystem is designated as the master.

In the preferred embodiment, the communication medium is dually redundant; i.e., it consists of two coaxial cables. In normal operation both cables carry the same data signals. The timing subsystem designated as a master is provided with a timing subsystem driver circuit which drives quasi-sinusoidal timing signals having a frequency of 12.5 KHz onto one of the coaxial cables of the transmission medium. A second timing subsystem designated as a slave is also provided with such a driver circuit and applies timing signals onto the second coaxial cable of the dually redundant transmission medium. The length of the cables is limited to the length of substantially 1000 ft. in the preferred embodiment. For additional information on this environment, reference is made to the following concurrently filed patent applications:

1. Method and Apparatus for Synchronizing Timing Subsystems of the Physical Modules of a Local Area Network, by David L. Kirk, Application Ser. No. 682,645, filed Dec. 17, 1984, and
2. Driver Circuit, by Robert L. Spiesman, Application Ser. No. 682,522, filed Dec. 17, 1984, Both of the above identified applications are being filed concurrently with this application and are assigned to Honeywell Inc., the assignee of this application. The disclosures of the above identified applicaation are hereby incorporated by reference into this application.

SUMMARY OF THE INVENTION

The transceiver of this invention applies to a transmission line input signals which signals are applied to the transmitter circuit of the transceiver. The input signals are Manchester encoded binary data signals of a given frequency. Signals carried by the transmission line are applied to a data signal receiver circuit of the transceiver. The data signal receiver circuit of the tranceiver amplifies and reshapes any data signals present on the transmission line, or applied to the transmission line by the transceiver's transmitter circuit, and produces such data signals as the data signal output of the transceiver. Timing signals representing encoded timing data at a different frequency from that of the data signals also present on the transmission line are applied to a timing signal receiver of the transceiver which amplifies and squares the quasi-sinusoidal timing signals present on the transmission line and produces squared timing signals as the timing signal output of the transceiver. The timing signals in the preferred embodiment have a significantly lower frequency than the frequency of the data signals, and both types of signals can be and normally are present at the same time on the transmission line.

It is therefore an object of this invention to provide a transceiver which can drive onto a transmission line through a coupling transformer high frequency substantially square wave signals and can receive from the transmission line through the coupling transformer any such high frequency signals present on the transmission line and also can receive lower frequency quasi-sinusoidal signals present concurrently on the transmission line.

BRIEF DESCRIPTION OF THE DRAWING

Other objects features and advantages of the invention will be readily apparent from the following description of a preferred embodiment thereof, taken in conjunction with the accompanying drawing, although variations and modifications may be affected without departing from the spirit and scope and of the novel concepts of the disclosure, and in which the sole FIGURE is a circuit diagram of the transceiver of this invention.

DESCRIPTION OF THE PREFERRED EMBODIMENT

In the drawing, transceiver 10 is operationally connected by coupling transformer 12 to 75 ohm coaxial cable 14, the transmission medium, or line, of a local area network. One end of transmission line winding 16 of transformer 12 is connected to the central conductor of cable 14 and the other end is connected to the cylindrical outer shield of cable 14. Cable 14 carries, or as applied to it, two signals, a Manchester encoded 5.0 MHz substantially square wave signal sometimes identified as a data signal, or data signals; and a 12.5 kHz quasi- or pseudo-, sinusoidal signal, sometimes hereafter referred to as a timing signal, or timing signals since the timing signals represent, in the preferred embodiment encoded timing information.

Transformer coupling between coaxial cable 14 and transceiver 10 is used to isolate the ground potentials of transceiver 10 from transmission line 14 and from the ground potentials of other transceivers other physical modules of the local area network of which cable 14 and transceiver 10 or elements as described in the above identified concurrently filed Kirk application Ser. No. 682,645, filed 12/17/84. The transceiver of each of the physical modules of such a network are substantial duplicates of the transceiver 10 illustrated. The presence of 5.0 MHz data signals and 12.5 kHz timing signals on cable 14 produce or induce voltages across transceiver winding 18 of coupling transformer 12 in which both the data and timing signals present on cable 14 exist. The signals across transceiver winding 18 are applied to the inverting and noninverting terminals of operational amplifier 20 through low pass R.C. filter 22 which filters out the 5.0 MHz data signal from the composite signal applied to operational amplifier 20. Capacitor 24 is connected between pins 1 and 8 of operational amplifier 20, to control its frequency response. Operational amplifier 20 removes from its output at pin 6 any of the 5.0 MHz not removed by filter 22. The output of operational amplifier 20 thus, is the 12.5 kHz timing signal. The output of operational amplifier 20 is coupled through capacitors 25 and 26 which are connected in parallel to the inverting input of voltage capacitor 28. The voltage on the noninverting input of comparator 28 is a reference voltage of approximately 10 to 20 millivolts (mv.) so that the output of comparator 28 at its terminal 12 is normally high when no signal is being applied to its inverting input. Comparator 28 squares the quasi-sinusoidal timing signals applied to it so that the output of comparator 28 is a square wave signal, the pulse width of which is representative of the pseudo-sinusoidal wave applied to its noninverting input.

The amplitude of the 12.5k timing signals applied to a given transceivers timing signal receiver from the coaxial cable 14 varies as a function of the number of physical modules connected to cable 14 and the length of cable 14. As a result, the width of the square waves produced by comparator 28 may vary from 30-60 microseconds ($\mu$sec.). Such undesirable variations in pulse width are eliminated by connecting the output of comparator 28 to one shot multivibrator 30, the time constant of which is set to 40 $\mu$sec. Multivibrator 30 senses the leading edges of the output signals of comparator 28 so that each pulse produced by comparator 28 is converted into a square wave signal having the period corresponding to a frequency of 12.5 kHz at the output of one shot multivibrator 30. The output of multivibrator 30 is applied to differential driver 32 which produces amplified and reshaped 12.5 kHz timing signals at TTL levels. The timing signals produced by driver 32 are one of the two outputs of transceiver 10. The timing signal output of transceiver 10 is produced by its timing signal receiver which includes filter 22, operational amplifier 20, comparator 28, one shot 30 and driver 32.

The signals across transceiver winding 18 are also applied to very high frequency differential amplifier 34 of the data signal amplifier of transceiver 10 which amplifies the composite signal, both the 5.0 MHz data signals and the 1.25 kHz timing signals present. The output of differential amplifier 34 passes through high pass R.C. filter 36 which removes any 12.5 kHz timing signals. The 5.0 MHz data signals out of filter 36 are applied to a very high speed voltage comparator 38. The 5.0 MHz signals applied to comparator 38 may not be a square wave as applied to cable 14 because the higher frequency compenents of the square wave signals are attenuated to some degree by the characteristics of cable 14. Comparator 38 squares the 5.0 MHz data signals so that their wave form is once again that of a square wave with pulse widths of 100±10 nanoseconds. The squared up and amplified data signals, the output of comparator 38 passes through Nor-Gates 39 and 40 when both are enabled. Another function of gates of 39 and 40 will be explained below. From gate 40 the output signals of comparator 38 are applied to differential driver 42 which produces amplified and reshaped, or squared, 5.0 MHz data signals at TTL levels, the second output of transceiver 10. The data signal output of transceiver 10 is produced by its data signal receiver which includes differential amplifier 34, filter 36, voltage comparator 38 and driver 42.

Data signals, Manchester encoded binary square wave signals at a frequency of 5.0 MHz, that are to be driven onto, or applied to, cable 14 are designated as TXDATA+ on the drawing and are the data input signal to the amplifier circuit of transceiver 10. The data signals TXDATA+ are input to differential driver 44, the two outputs of which are applied respectively to the bases of npn transistors 46, 47. The center tap of transceiver winding 18 of coupling transformer 12 is connected to a +5 VDC power supply with the collector of transistor 46 connected to one end of winding 18 and collector of transistor 47 connected to the other. When transistor 46 is turned on, a voltage will be developed across transmission line winding 16 of one polarity and a voltage of the opposite polarity is developed across winding 16 when transistor 47 is turned on to drive or apply a bipolar square wave data signal having a peak to peak voltage of 800 m v and corresponding to TXDATA+ onto coaxial cable 14.

Differential driver 44 is a tri-state device, the outputs of which are forced to their high impedance state when the voltage on pin 4 of driver 44 is a logic zero. Driver 44 is enabled when the output of negative And gate 48, the signal XMITEN+ is positive. The inputs to gate 48 are the transmit enable control signal TXMITA− and the loop back control signal TXLOPA+. To enable driver 44, the control enable signal, TXMITA− must be negative and the loop back control signal TXLOPA+ must also be negative. When TXLOPA− is positive Nor gate 50 is disabled which prevents data signal TXDATA+ from being applied as one input to Nor Gate 40.

At such time as control signals TXLOPA+ is positive and TXLOPA− is negative, the signal XMITEN+ is also negative or a logic zero which disables driver 44 and puts it in its disabled high impedance state. Transistors 46 and 47 will both be off when driver 44 is high in its impedance state. Nor gate 50 is enabled by the signal TXLOPA− and Nor gate 39 is disabled by the signal TXLOPA+. Data signals TXDATA+, will under these circumstances, be applied through Nor gates 50 and 40 to differential driver 42. Thus, when TXLOPA+ is positive, data signals TXDATA+ are applied to the differential driver 42 which causes the signals TXDATA+ as applied to transceiver 10 to be the data signal output of transceiver 10.

The reason for looping back data signal TXDATA+ is to permit TXDATA+ to be tested without driving it onto cable 14, since if TXDATA+ were not within specifications, it could interfere with the proper operations of other physical modules of the network receiving signals from cable 14.

Differential driver 44 includes a circuit which causes the outputs of driver 44 to be in their high impedance output state during the transitions associated with powering up and powering down. This high impedance state assures that transitors 46 and 47 will be off during such transitions. As a result the data transmitter circuit of transceiver 10 which includes differential driver 44, and transistors 46 and 47 will present a high impedance to transmission line 14 during such transitions as well as when no data signals are being driven onto the coaxial cable 14 by transceiver 10's transmitter circuit.

The data receiver of transceiver 10 produces data signals as its output whether the source of the data signals is from transmission line 14, the data signal transmitter circuit of transceiver 10, or when transceiver 10 is in its loop back mode, the data signals TXDATA+ are applied directly to the line driver 42 of its data receiver circuit. The timing signal circuit of transceiver 10 produces only timing signals as its output, which timing signals are received only from cable 14 of the local area network. It should be noted that in the preferred embodiment each physical module of the local control network is provided with two transceivers as illustrated. One for each of the coaxial cable of the transmission medium. As a result, each physical module can transmit and receive data signals over both cables and can also receive timing signals from both cables of the transmission medium.

From the foregoing it is believe obvious that the transceiver of this invention can transmit to or receive data signals from a coaxial cable and simultaneously receive a lower frequency timing signal.

In the preferred embodiment the significant components of transceiver 10 are:
op amp 20—LM 301A
Voltage comparator 28—LM319
Multivibrator 30—96L02
Differential Driver 32, 42 & 44—DS3487
Differential Amplifier 34—LM733
Voltage Comparator 38—LM361
which are commercially available products of the National Semiconductor Corp.

What is claimed is:

1. A transceiver for applying substantially square wave data signals having a first frequency to a coaxial cable and of receiving data signals carried by the coaxial cable and quasi-sinusoidal timing signals having a second frequency, which data and timing signals are carried concurrently by the coaxial cable, comprising:
a coupling transformer having a transmission line winding and a transceiver winding;
transmitter means connected to the transceiver winding for inducing a voltage across the transmission line winding to apply data signals to the coaxial cable;
first receiver means connected to the transceiver winding for receiving and reshaping data signals present in voltage across the transceiver winding; and
second receiver means connected to the transceiver winding for receiving, amplifying and reshaping the quasi-sinusoidal timing signals into substantially square wave signals of the second frequency.

2. A transceiver for applying substantially square wave Manchester encoded data signals having a first frequency and a predetermined maximum peak to peak voltage to a coaxial cable and of receiving data signals and quasi-sinusoidal timing signals, said timing signals having a second frequency, which data and timing signals are present at the same time on the coaxial cable, comprising:
a coupling transformer having a transmission line winding and a transceiver winding, the transmission line winding being connected to the coaxial cable so that signals driven onto the transmission line induce corresponding signals across the transceiver winding of the coupling transformer;
a transmitter circuit connected to the transceiver winding, said transmitter circuit in response to data signals being applied to the transmitter circuit causing the coupling transformer to induce voltages across the transmission line winding to apply data signals to the coaxial cable;
a first data signal receiver connected across the transceiver winding for receiving and reshaping data signals present in the signals across the transceiver winding, said data signals receiver including a driver circuit for making the data signals available as an output of the transceiver; and
a timing signal receiver connected across the transceiver winding for receiving and reshaping timing signals present in the signals across the transceiver winding into substantially square shaped signals of the second frequency, said timing signal receiver including a driver circuit for making the timing signals available as an output of the transceiver.

3. A transceiver as defined in claim 2 in which the frequency of the data signals is 5.0 MHz.

4. A transceiver as defined in claim 3 in which the frequency of the timing signals is 12.5 KHz.

5. A transceiver for applying substantially square wave Manchester encoded data signals having a first frequency and a predetermined maximum peak to peak voltage to a coaxial cable and of receiving data signals and quasi-sinusoidal timing signals from the coaxial cable, said timing signals having a second frequency, which data and timing signals are present at the same time on the coaxial cable, comprising:
a coupling transformer having a transmission line winding and a transceiver winding, the transmission line winding being connected to the coaxial cable so that voltages across the transmission line winding drive corresponding signals onto the cable, and signals carried by the transmission line induce voltages corresponding to the signals present on the coaxial cable across the transceiver winding of the coupling transformer;
a transmitter circuit connected to the transceiver winding, said transmitter circuit in response to data signals being applied to it causing the coupling transformer to induce voltages across the transmission line winding to apply data signals applied to the transmitter circuit to the coaxial cable, and in response to a loop back enabling signal being applied to it, causing the transmitter circuit not to induce voltages across the transmission line winding;

a data signal receiver connected across the transceiver winding to receive and to reshape data signals present in the voltages across the transceiver winding, said data signal receiver means including a driver circuit to make such data signals available as an output of the transceiver;

a timing signal receiver connected across the transceiver winding to receive and to reshape timing signals present in the voltages across the transceiver winding into substantially square wave signals of the second frequency, said timing signal receiver including a driver circuit to make timer signals available as an output of the transceiver; and loop back circuit means when enabled in response to a loop back enabling signal being applied thereto for applying data signals applied to the transceiver directly to the driver circuit of the data signal receiver, said loop back enabling signal also disabling the transmitter circuit.

* * * * *